June 11, 1935.  R. W. ANGSTMAN  2,004,151
HEATER APPARATUS
Filed Dec. 27, 1932  6 Sheets-Sheet 1

INVENTOR
Roger W. Angstman
BY Braselton, Whitcomb & Davies
ATTORNEYS.

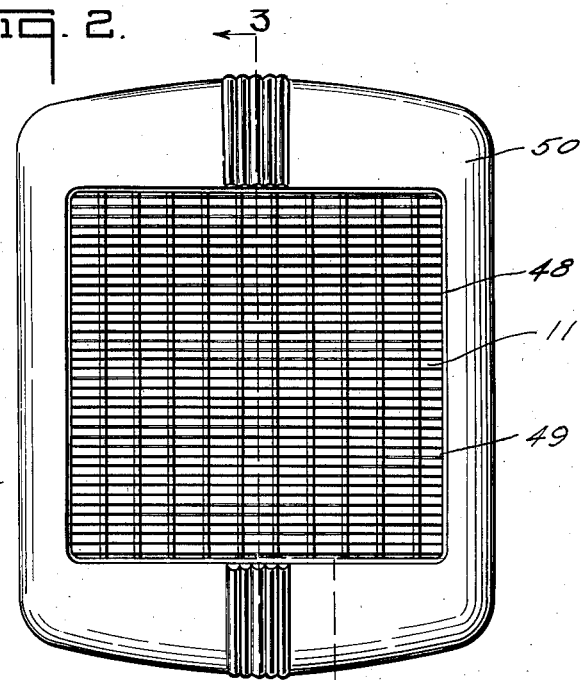
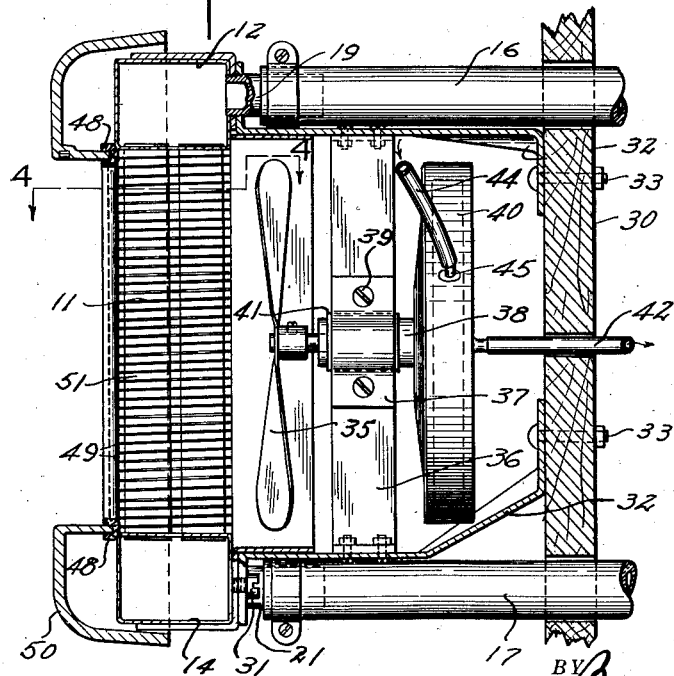
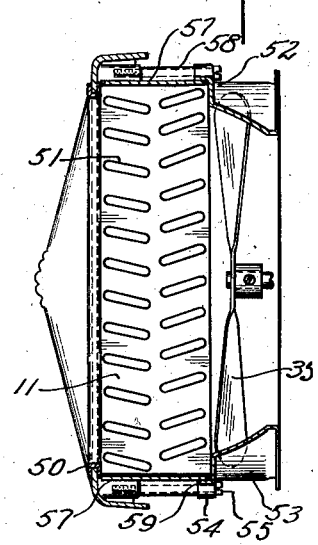

June 11, 1935.  R. W. ANGSTMAN  2,004,151
HEATER APPARATUS
Filed Dec. 27, 1932  6 Sheets-Sheet 3

INVENTOR
Roger W. Angstman
BY Braselton, Whitcomb & Davies
ATTORNEYS.

June 11, 1935. R. W. ANGSTMAN 2,004,151
HEATER APPARATUS
Filed Dec. 27, 1932 6 Sheets-Sheet 4
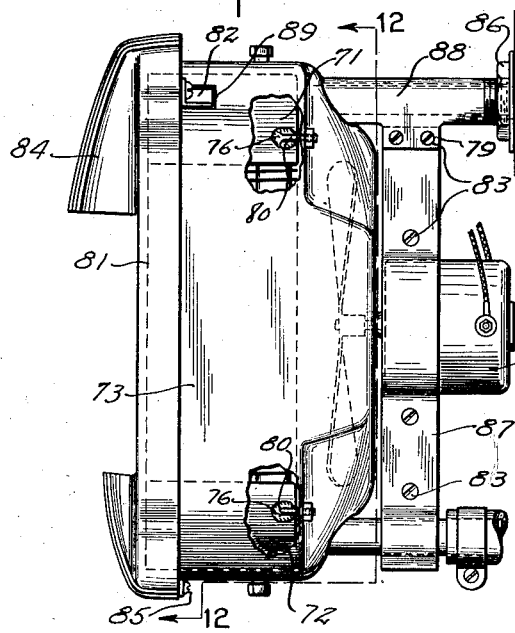
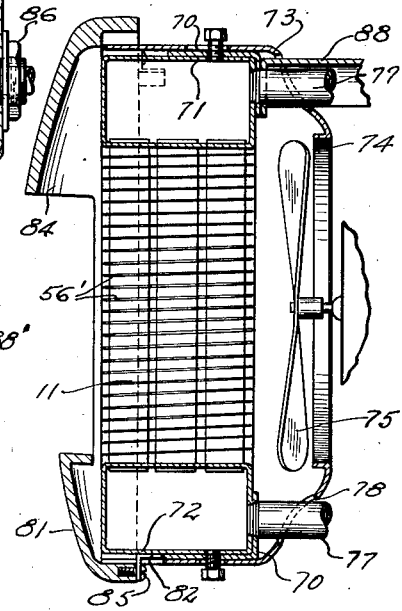
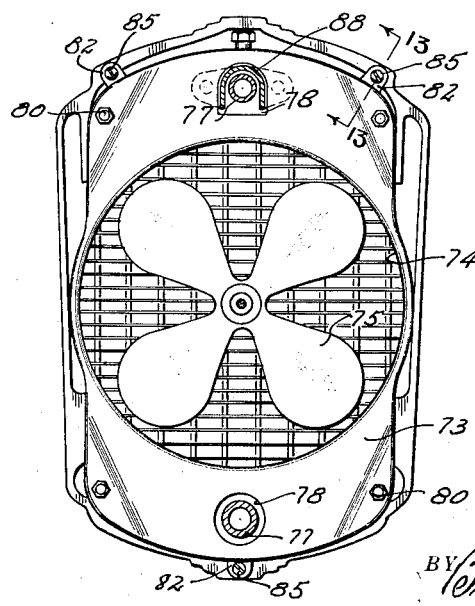
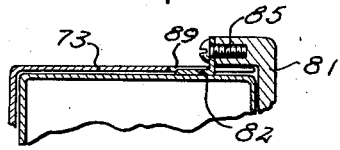
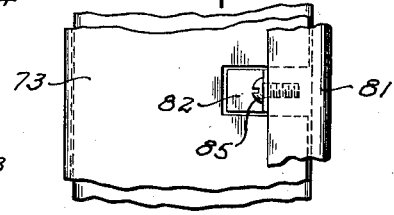
INVENTOR
Roger W. Angstman
BY Chaselton, Whitcomb Davies
ATTORNEYS.

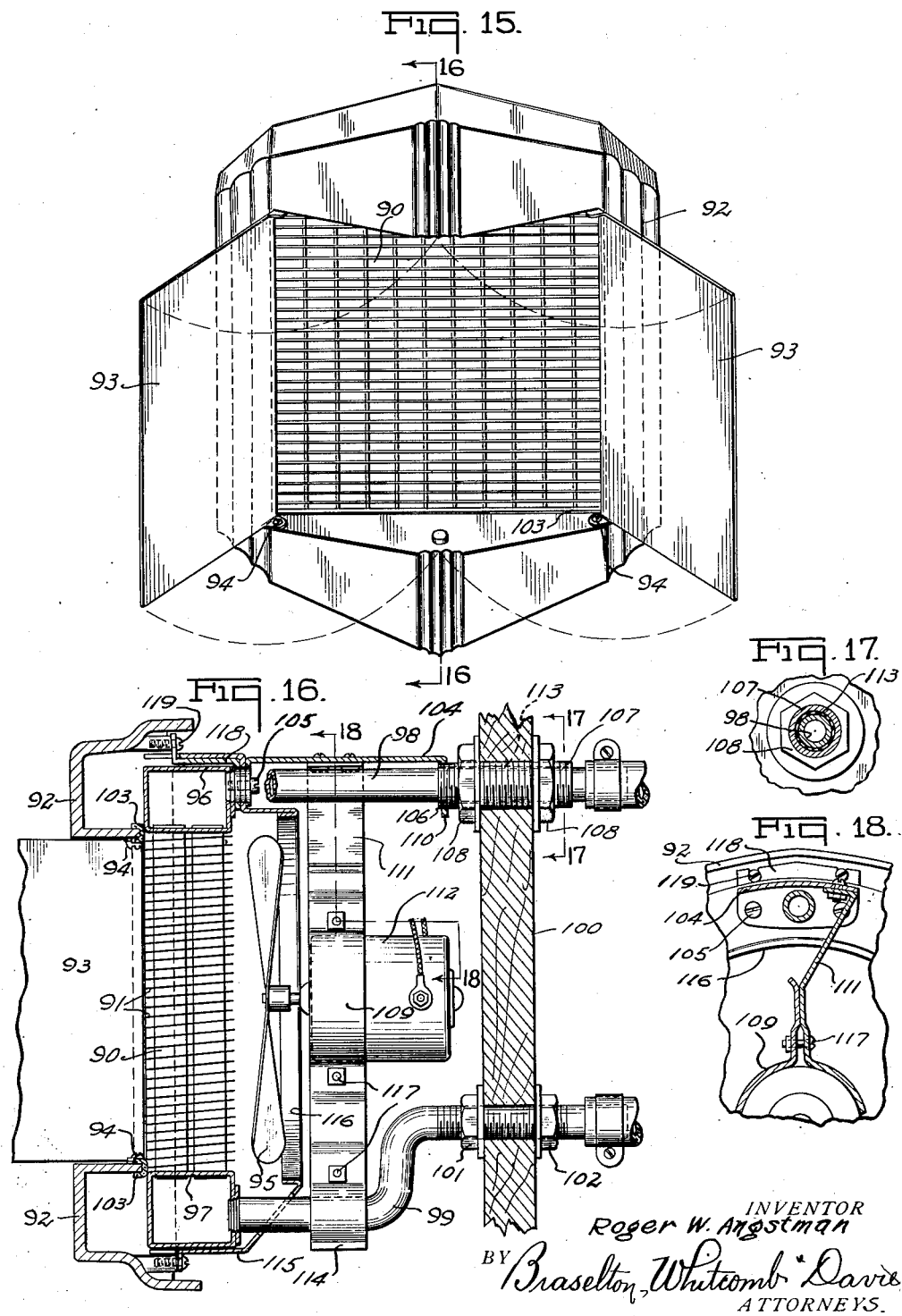

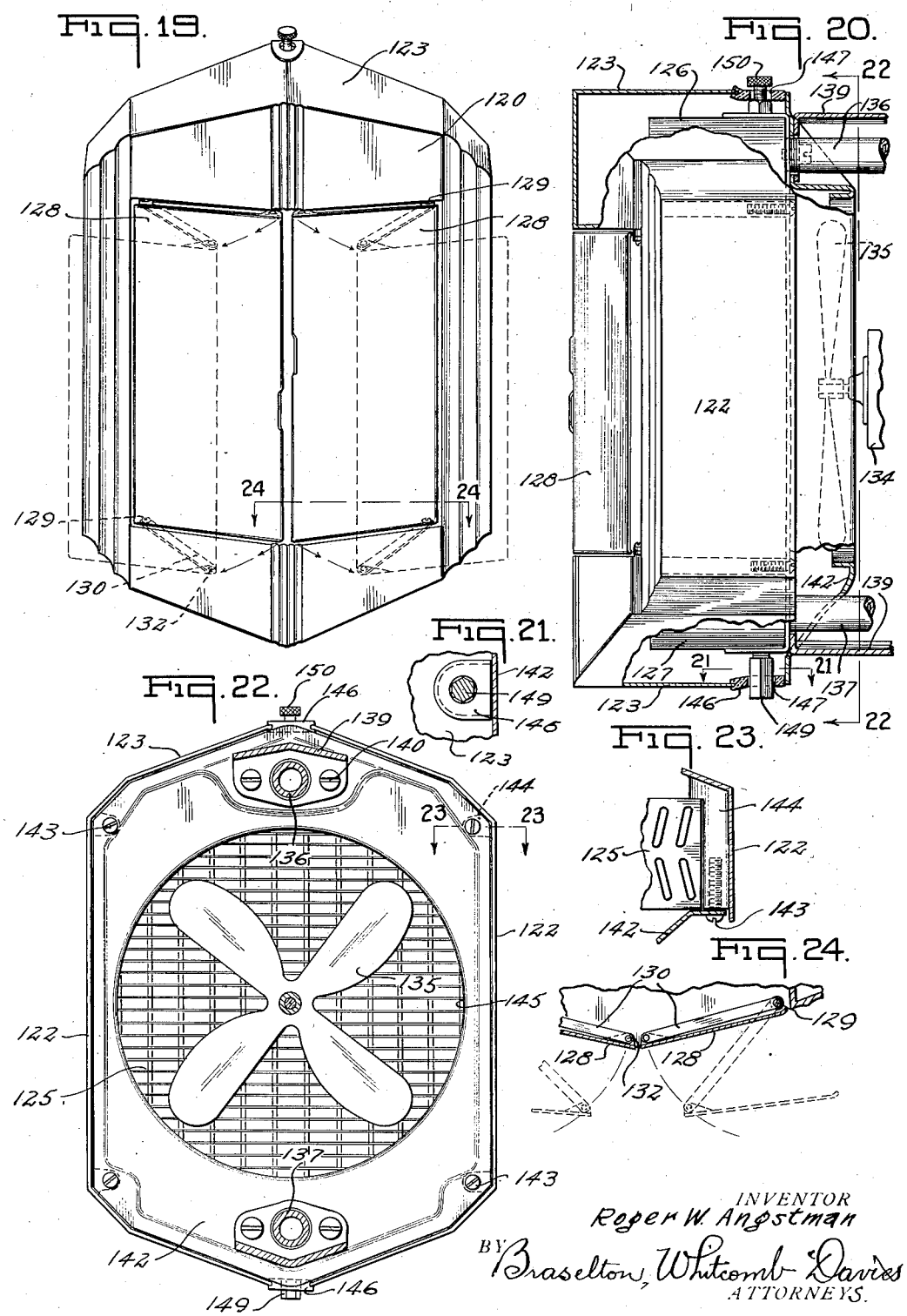

Patented June 11, 1935

2,004,151

UNITED STATES PATENT OFFICE 2,004,151

HEATER APPARATUS

Roger W. Angstman, Pontiac, Mich., assignor, by mesne assignments, to E. A. Laboratories, Inc., Brooklyn, N. Y., a corporation of New York Application December 27, 1932, Serial No. 648,936

13 Claims. (Cl. 257—137)

This invention relates to heaters, and more particularly to automotive vehicle heaters particularly adapted for supplying heated air to the interior of the vehicle.

The invention embraces the provision of a heating unit mounted within the vehicle body and connected to be supplied with heat from a medium as for example, the fluid circulating system of the prime mover.

The invention contemplates the utilization of a heating unit or radiator having fluid supply and return pipes connected thereto and a power operated fan for forcing air through the heating unit.

The invention further contemplates the utilization of shrouds and deflectors of novel construction for controlling the passage and circulation of air through the heating unit.

A further object of the invention resides in the provision of novel and efficient supporting means and installation elements for the heating unit.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawing of a form of the invention, which may be preferred, in which:

Figure 2 is a front view of the heating unit illustrated in Figure 1;

Figure 3 is a sectional detail taken substantially on the line 3—3 of Figure 2;

Figure 4 is a sectional detail taken substantially on the line 4—4 of Figure 3;

Figure 1 is a section through the front portion of the heater unit illustrated in Figure 5, certain parts being shown in section;

Figure 10 is a side plan view of another form of a heater unit of the invention;

Figure 11 is a vertical longitudinal sectional view of the heater unit shown in Figure 10;

Figure 12 is a rear view of the heater unit illustrated in Figure 10 showing a form of shroud construction and mounting of my invention;

Figure 13 is a fragmentary detail sectional view taken substantially on the line 13—13 of Figure 12;

Figure 14 is a fragmentary top view of the structure shown in Fig. 13;

Figure 15 is a front view of a further form of heater unit, my invention particularly showing one form of air deflecting means;

Figure 16 is a detail sectional view taken substantially on the line 16—16 of Figure 15;

Figure 17 is a detail sectional view taken substantially on the line 17—17 of Figure 16;

Figure 18 is a detail sectional view taken substantially on the line 18—18 of Figure 16;

Figure 19 is a front view of a still further form of heater unit of my invention;

Figure 20 is a fragmentary side view of the structure illustrated in Figure 19, portions being shown in section;

Figure 21 is a detail sectional view taken substantially on a line 21—21 of Figure 20;

Figure 22 is a rear view taken substantially on a line 22—22 of Figure 20;

Figure 23 is a detail sectional view taken substantially on the line 23—23 of Figure 22;

Figure 24 is a detail sectional view taken substantially on a line 24—24 of Figure 19.

While I have illustrated a heater or heating unit of my invention as particularly adapted for use in heating the interior of an automotive vehicle, it is to be understood that I do not wish to limit the invention to the particular disclosure illustrated, and that I contemplate its utilization in any heater wherever the same may be found to be applicable.

Figure 1:
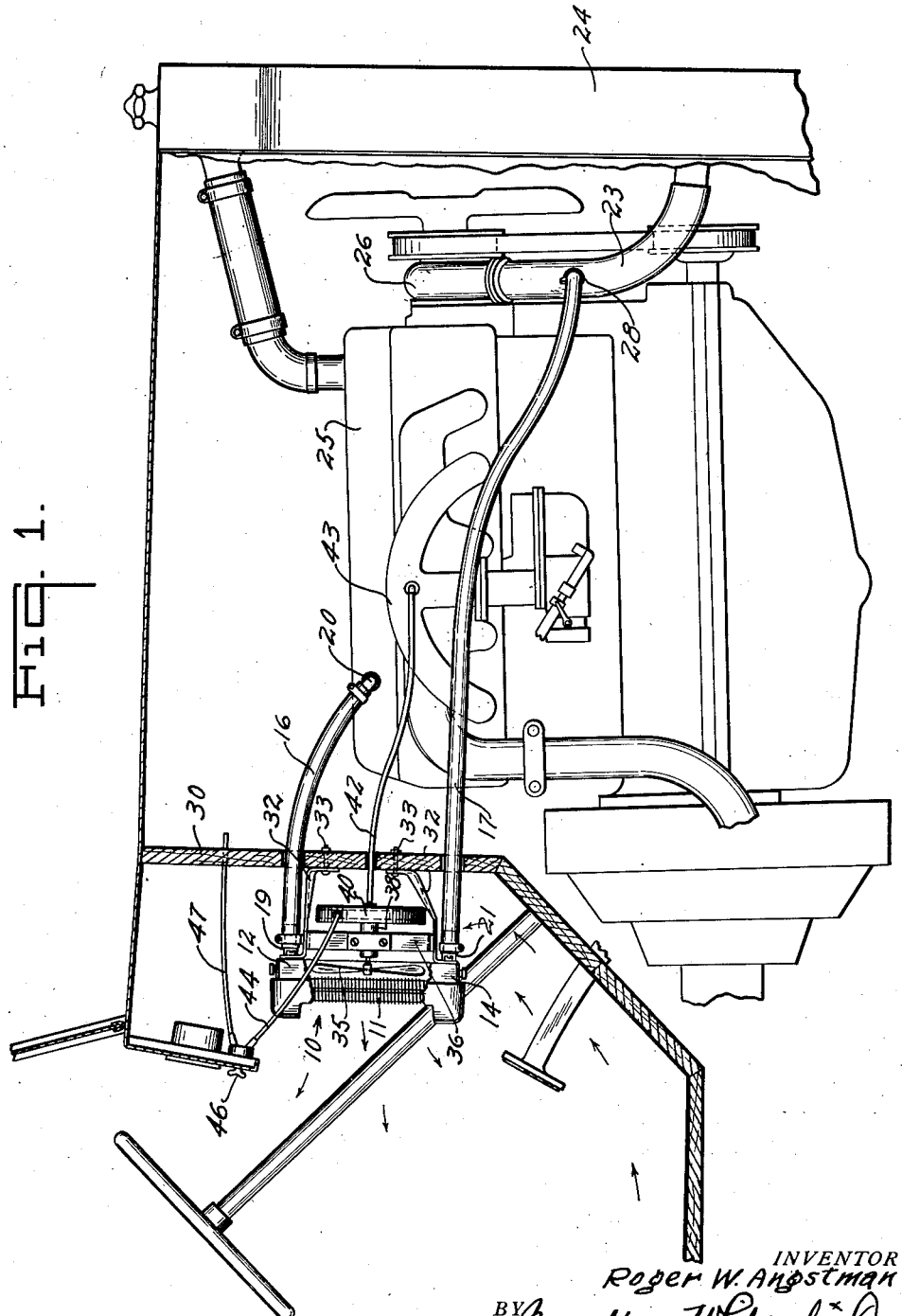
Figure 1 is a section through the front portion of an automotive vehicle showing a form of the invention.
Figure 5:
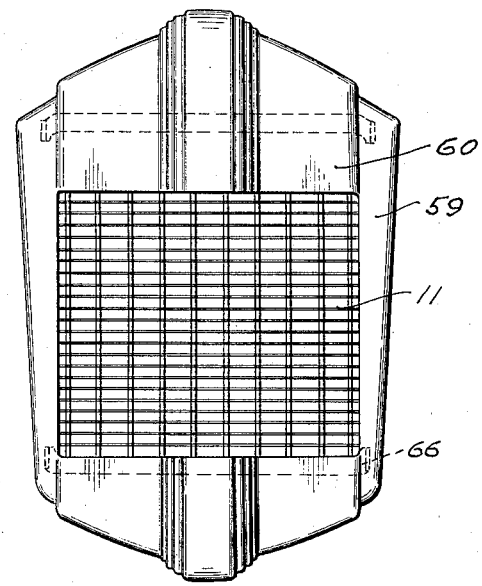
Figure 5 is a front view of another form of the heater unit of my invention.
Figure 6:
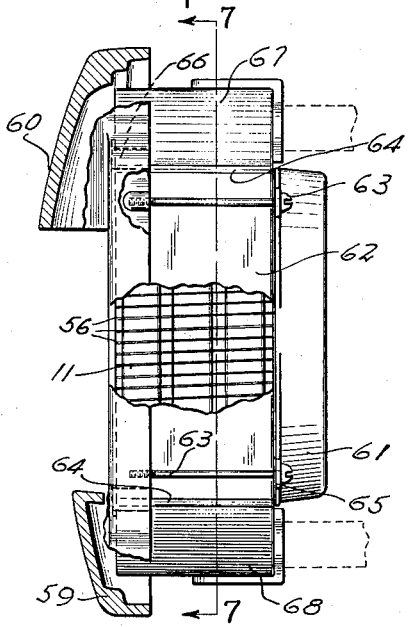
Figure 7:
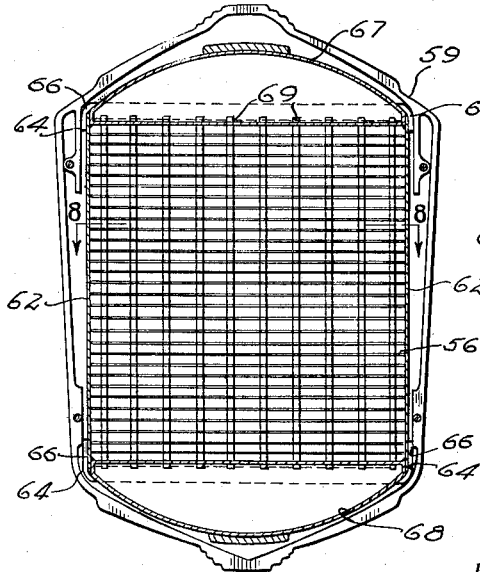
Figure 7 is a detail sectional view taken substantially on the line 7—7 of Figure 6.
Figure 8:
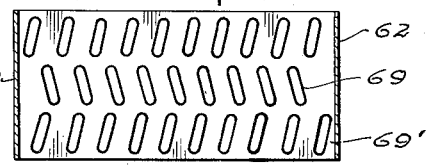
Figure 8 is a detail sectional view taken substantially on the line 8—8 of Figure 7.
Figure 9:
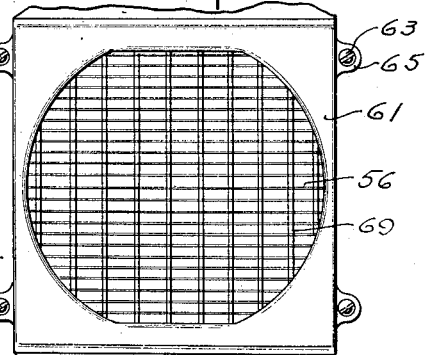
Figure 9 is a fragmentary view of the rear of the unit illustrated in Figure 5 showing a form of shroud construction of my invention and mounting therefor.

Referring to the drawings in detail, a form of the invention has been illustrated as incorporated in an automotive vehicle, Figure 1 illustrating a desirable method or system of installation. As particularly illustrated in Figures 1 through 4 inclusive the heater unit of my invention includes a radiator or heating unit 10 having a core 11, and upper header or tank 12 and a lower header or tank 14 connected to fluid supply conduits 16 and 17 respectively. The tank 12 is provided with a connection 19 to which one end of conduit 16 is suitably connected, the other end of the conduit being connected to a fitting 20 threaded into or otherwise secured in an opening in the motor water cooling system at a point where the water or other fluid in the prime mover is in a heated condition.

The tank 14 is provided with a connection 21 to which conduit 17 is suitably connected, the other end of conduit 17 being connected into the lower fluid outlet hose connection 23 preferably arranged between the vehicle cooling radiator 24 and the water pump 26 of the internal combustion engine or prime mover 25 as at 28. The conduits 16 and 17 may be reversed whereby the heated fluid may flow into the lower tank 14 and out of upper tank 12 and conduit 17 without departing from the spirit of the invention.

As a means for securing the heater unit 10 to the dash 30 or other suitable support, I have provided a plurality of brackets or supports 32 preferably formed of sheet metal which may be suitably secured adjacent the conduit connections 19 and 21 by means such, for example, as screws 31, and to the dash or support 30 by means such as bolts 33. The brackets 32 also preferably provide supporting means for a motor 40 actuating a fan 35 or air circulating means which is preferably positioned adjacent the rear of the radiator core 11 by means of a plate or support 36 which embraces the bearing extension member 38 of motor 40. An element 37 is removably secured to support 36 by means such as screws 39 to retain the motor in position and by manipulating screws 39 the motor extension 38 may be adjusted longitudinally relative to the brackets or elements 36 and 37. A bushing 41 of rubber or other suitable vibration damping material is preferably interposed between bearing extension 38 and brackets 36 and 37 to absorb vibrations. In the form of my invention as illustrated in Figures 1 and 3, the motor 40 has been illustrated as an air motor having a connection by means of the tube 42 to the intake manifold 43 of the prime mover of the vehicle. A second conduit 44 connects the air motor 40 to a control means 46 suitably mounted within reach of the vehicle operator, which control means is in turn connected by conduit or tube 47 to the atmosphere, in the embodiment shown to the engine compartment.

The motor is of a type such that when the prime mover of the vehicle is running, the vacuum existing within the intake manifold of such prime mover extracts or withdraws air from the interior of the motor casing 40. The tube 44 leading from the control means to the motor chamber terminates in a jet or nozzle 45 which is suitably positioned with respect to the blades of the motor rotor not shown, arranged within the casing 40, so that the inrushing air caused by the withdrawal of the air from the motor casing or vacuum sets up a rotation of the motor rotor. The control means 46 consists of a suitable valve arrangement, not shown in detail, for regulating the supply of air to the conduit 44 and the motor casing, thus varying the speed of the fan motor.

As clearly illustrated in Figure 2, the front of the heater unit is provided with an exterior shell 50 which directs or confines the circulating air through the space embraced by the shell, and directs the warmed or heated air into the vehicle interior. This form of the invention is provided with a shroud 52 partially enclosing the fan 35, illustrated in detail in Figures 3 and 4. The shroud comprises a housing 53 provided with ears 54 having openings therein to receive studs or screws 55 which are threaded into suitable openings in the shell 50 to fixedly secure the plate 53 and shell 50 relative to the core 11. The sides of the core are provided with enclosures in the form of removable plates 57 provided with raised portions 58 to accommodate the studs 55. Plates 57 are positioned adjacent the sides of the core 11 by means such as are provided in the flanged portion 59 of back plate 53 which clamp or bind the plates 57 in position, the plates 57 serving as a locating or positioning means for the front shell 50. Means such as the elements 48 of rubber or other suitable material, may be provided between the core 11 and portions of the shell 50 to absorb vibrations.

It should be noted that in this form of the invention a plurality of fins 49 are positioned angularly with respect to a horizontal plane to direct the heated air downwardly. Vertically positioned water tubes 51 of the core 11 are arranged angularly with respect to each other and to a vertical longitudinal plane of the heater so that air is directed more particularly to one side of the heater unit.

A further form of the invention has been illustrated in Figures 5 to 9, inclusive, in which the core 11 of the heater unit is provided with a forward face plate 59 which is formed with a fixed deflector portion 60 for confining the circulation of air and directing the air downwardly and into the interior of the vehicle. In this form of the invention the shroud or means for directing air through the core comprises a back plate 61 having a substantially circular opening adapted to accommodate the air circulating fan (not shown). This plate 61 is provided with ears 65 having openings therein to receive studs 63 which are threaded into suitable openings in the face plate 59 to secure the face plate and back plate 61 in fixed relation with respect to the core. An enclosure is provided for the sides of the core comprising plates 62 which are preferably secured to the top and bottom tanks 67 and 68 as by soldering at 64 and if desirable may also be secured to the side edges of the fins 49. To prevent vibrations and thus noises, it has been found desirable to provide an element such as a rubber or other non-metallic strip 66 between portions of the core 11 and the face plate 59.

It should be noted that in this form of the invention a plurality of fins 56 are arranged at an angle with respect to a horizontal plane for the purpose of directing heated air downwardly. As particularly illustrated in Figure 8, the vertically positioned water tubes 69 of the core 11 are angularly arranged with respect to a vertical longitudinal plane of the heater so that the air on passing the line of water tube 69' will be deflected in a direction of the plane of the tubes so as to effect an indirect heat towards the driver's or operator's position of the vehicle. In this form of the invention a structure is provided which is easily assembled and the number of parts reduced to a minimum.

In the embodiment illustrated in Figures 10 to 14, inclusive, I have provided a shroud construction 73 capable of being supported by the tanks 71 and 72 arranged above and below the core structure 11. In this embodiment, it will be noted that I have provided a shroud 73 completely enclosing the sides of the core, an opening 74 being provided in the rear thereof to accommodate a fan 75 and to provide an air intake opening. Each of the tanks 71 and 72 is provided with a conduit connection 77, an opening 78 being provided in the shroud 73 to permit the connections to extend therethrough. The tanks are reinforced at the water inlet and outlet connections by means of angular brackets 70 welded or otherwise secured to the tanks.

In order that the shroud 73 may be secured in position adjacent the core, I have provided a plurality of studs 80 having flattened portions welded or otherwise secured to the tanks 71 and 72 as at 76 for securing the shroud thereto. A plurality of brackets or securing members 82 are secured as by welding to the tanks 71 and 72 to which is removably secured the front plate 81 having a deflector portion 84 which deflector directs the circulation of air into the interior of the vehicle. The front plate 81 is provided with a plurality of screw threaded openings to accommodate screws 85 for connecting the plate to the brackets 82. Water inlet and outlet connections 77 which are preferably metal pipes, one of which suitably supports one end of an adjustable bracket 87 formed in two halves held together by screws 83 which in turn supports a motor 88' for driving the fan 75. The other end of bracket 87 is supported by a bracket or support 88 a portion of which surrounds the connection 77 and being screw threaded, is adapted to be secured in an opening in the dash by means such as the nuts 86. The support 88 is preferably of sheet metal suitably formed to provide the projection 79 adapted to receive screws 83. In this embodiment I have illustrated an electric motor 88' for circulating the air, but it is to be understood that any other suitable type of motor may be utilized. The shroud 73 extends forwardly to provide a suitable positioning or locating means for the front plate 81, portions 89 of which are cut out to accommodate brackets 82. The fins 56' are inclined downwardly for the purpose as hereinbefore stated of directing the heated air downwardly as it leaves the heating unit. Thus, I have provided a heating unit wherein the shroud and deflector arrangement is capable of being easily assembled and which is very effective to direct the flow or circulation of air through the radiator core 11 and into the vehicle interior.

The modified form of my invention illustrated in Figures 15 to 18, inclusive, is inclusive of a radiator core 90 having downwardly inclined vanes or fins 91 adjacent the front portion of which is positioned a shell or front plate 92 which is provided with a plurality of movable deflector units 93 pivoted to the front plate as at 94 capable of being pivotally adjusted about a vertical axis relative to the casing 92 to direct or control the circulation of air created by a fan 95. The core 90 is provided with upper and lower tanks 96 and 97 respectively, which in turn have inlet and outlet pipes 98 and 99 extending through the vehicle dash 100. The outlet pipe 99 is directly supported by the dash 100 by means of the nuts 101 and 102 having threaded engagement with the pipe. A bracket or support 104 is provided adjacent the conduit 98 which is secured to the tank 96 by means of screws 105. The other end of the bracket is provided with a threaded sleeve 107 which surrounds but does not contact the inlet pipe, this sleeve projects through an opening in the dash and is adapted to be secured thereto by means of nuts 108. Preferably interposed between the sleeve 107 and the wall of the pipe 98 is a bushing 113 of sound deadening material to prevent metallic contact of these parts. The end of the threaded sleeve 107 is suitably swaged or otherwise secured as at 106 to a projection 110 of the bracket 104. As illustrated in detail in Figure 18, the bracket 104 suitably supports a second bracket member 111 adapted to support motor 112, which, in the embodiment disclosed, is an electric motor for driving the fan 95. The bracket 111 is suitably connected at its other end 114 to outlet pipe 99, a second bracket 109 being secured to the bracket 111 by means of screws 117 to retain the fan motor in position and to clamp bracket 111 securely to the pipe 99. To prevent metallic contact between portions of the core 90 and shell 92 a rubber or other suitable non-metallic cushion member may be provided as at 103. It is to be noted as shown in Figs. 2 and 3 the rubber or non-metallic cushion member may if desired extend substantially around the inner periphery of the front plate adjacent the forward portion of the radiator unit.

I have provided a shroud 115 adjacent the rear portion of core 90 to enclose the rear portion and sides thereof, and direct air through the core, an opening 116 being provided to accommodate the fan 95. In this form of the invention, it will be noted that the conduit pipe 99 and bracket 104 serve as a support for the heater unit and the fan and motor, the bracket 104 serving to relieve the strain caused by the weight of the heater from being transmitted to the water pipe 98 thus providing a rigid and substantial construction. By this construction, less strain due to motor and road vibration is present, and the danger of damaging the water connections is greatly lessened, while at the same time, the supporting structure is effective to provide a very substantial supporting means easily adjustable relative to the dash and permits of easy installation in the motor vehicle. As a means of supporting the front shell 92 relative to the core 90, I have provided a Z-shaped bracket 118 secured to the tank 96 by means of the screws 105 and to the shell 92 by means of screw 119. Screws 105 also serve to secure the shroud 115 adjacent the rearward portion of the core 90 and thus it will be noted that a very efficient and easily assembled structure unit has been provided.

In the modified form of my invention illustrated in Figures 19 to 24 inclusive, I have provided a shell or front plate 120, the portions 122 and 123 of which completely enclose the sides of a core 125 and the tanks 126 and 127, respectively. Adjacent the front portion of shell 120 is a plurality of relatively movable deflector units 128 pivotally connected thereto as at 129 by means of arms or extension elements 130 preferably having pivotal connections to the deflectors as at 132. Thus, it will be noted that by manipulating the deflectors 128, they may be positioned relative to the shell 120 in any number of desirable positions to direct the air forced through the unit by means such as the fan 135 driven by a suitable source of power as, for example, an electric motor, a portion of which has been illustrated at 134.

The tanks 126 and 127 are provided with an upper pipe 136 and a lower pipe 137, respectively, which are suitably connected to the engine cooling fluid circulating system of a vehicle. Brackets or supports 139 are provided adjacent the conduits 136 and 137 which may be supported in a manner similar to that shown in Figures 15 to 18, and are connected to the tanks 126 and 127 by means such as bolts 140. Bolts 140 also provide securing means for a back plate or shroud 142 which is further secured to the rear of shell 120 by means of screws 143 which extend through openings in the shroud and have threaded engagement with projections 144 provided adjacent the side portions 122 of the front plate 120. An opening 145 is provided in shroud 142 to accommodate fan 135 and also to provide an air inlet to the core 125.

As a means to prevent loss of air between the tanks 126 and 127, portions 123 of the front shell and the shroud 142, members or grommets 146 of rubber or other suitable material have been provided. The grommets 146 are provided with openings 147 to accommodate a drain plug 149 having screw threaded engagement with lower tank 127, and a relief valve 150 provided in the upper tank 126, which valve may be opened when the heating system is being filled with water to permit air to escape.

By this form of my invention, the side portions of the front shell provide a suitable enclosure for the sides of the core, while the shroud is secured thereto to enclose the rear of the core, providing a structure capable of easy assembly and a unit of high efficiency.

It is apparent that, within the scope of the invention, modifications and different arrangements may be made other than is herein disclosed, and the present disclosure is illustrative merely, the invention comprehending all variations thereof.

What I claim is:

1. In a heating unit, the combination of a core having upper and lower tanks; fluid connections secured to said tanks; a front shell defining the margins of said core; a channel-shaped rubber cushioning member interposed between said front shell and said radiator unit; a shroud enclosing the back of said core having an opening therein for the passage of air; means for securing the shroud to said core; means for securing the shell to said tanks; and a fan for circulating air through said core.

2. In a heating unit, the combination of a core having upper and lower tanks; said core having groups of vertically disposed fluid conducting tubes, said groups of tubes being angularly positioned to modify the direction of air passing said tubes; fluid connections secured to said tanks; a front shell defining the margins of said core and having a portion for deflecting air; a shroud enclosing the back of said core having an opening therein for the passage of air; means for securing the shroud to said core; means for securing said shell to said tanks; and means for circulating air through said core.

3. In a heating unit, the combination of a radiator core having upper and lower tanks; fluid connections secured to said tanks; a front shell defining the margins of said core; a non-metallic element between said shell and core; a shroud enclosing the back and sides of said core having an opening therein for the passage of air; means adjacent said fluid connections for securing the shroud to said tanks; a bracket held in position by said shroud securing means and forming one support for said unit; one of said fluid connections acting as additional support for said unit; means for securing said shell to said shroud; and motor driven means for circulating air through said core.

4. In a radiator unit, the combination of a radiator core having an upper and lower tank; fluid connections secured to said tanks, the connection to one of said tanks serving as a support for said unit; a bracket secured to the other of said tanks and forming a second support for said unit; a front shell defining the margins of said core; a shroud enclosing the back of said core and having an opening therein for the passage of air; means for securing the shroud to said core and shell; and a fan for circulating air through said core.

5. In a heating unit, the combination of a core having upper and lower tanks; fluid connections secured to said tanks, one of said connections serving as a partial support for said unit; a bracket secured to a header adjacent said other fluid connection; a sleeve secured to said bracket surrounding said fluid connection, said sleeve being secured to a support; non-metallic means between said fluid connection and said sleeve; a front shell; a shroud enclosing the back of said core and having an opening therein for the passage of air; means for securing the shroud to said core and shell; and a fan for circulating air through said core.

6. A heater of the character described including a radiator having inlet and outlet connections for conducting heating fluid to and from said radiator, means adjacent one of said connections for supporting said radiator, means for circulating air through said radiator, a front plate having deflector means for directing such air, a shroud surrounding said radiator for confining such air during its passage through the radiator, a bracket for supporting said radiator, and common means for securing said shroud and bracket to said radiator.

7. An air heating unit including a core; upper and lower tanks therefor, said core including a plurality of fluid conducting elements extending between and in communication with said tanks; a plurality of transversely arranged spaced vanes inclined downwardly toward the forward end of said core; said elements being arranged in groups, said groups being disposed angularly with respect to one another whereby the direction of air passing around said tubes is changed.

8. In a device of the character disclosed, a core; upper and lower tanks therefor, said core consisting of a plurality of fluid conducting elements extending between and in communication with said tanks; a plurality of transversely arranged spaced vanes inclined downwardly toward the forward end of said core; a front plate; a shroud positioned adjacent the rear of said core and having an opening; air circulating means positioned adjacent the opening in said shroud; means for securing said tanks, front plate and shroud together, said front plate having an air deflector integrally formed therewith; and inlet and outlet connections for said tanks.

9. A heat transfer unit comprising a core formed of vertically disposed water tubes and transversely arranged vanes inclined downwardly toward the forward portion of the core, said core having upper and lower tanks; a front plate defining the margins of the core, a shroud member positioned adjacent the rear of the core and having an air passage therethrough; a plurality of studs secured to said tanks, said studs forming means for securing the shroud to said tanks; a plurality of brackets affixed to said tanks and forming means for supporting the front plate upon said tanks; and inlet and outlet connections for said tanks.

10. A heat transfer unit including a core having upper and lower tanks, inlet and outlet connections for said tanks; a front shell; a back plate adjacent the rear of said core having an opening therein for the passage of air; means for securing the back plate to said shell; said shell having extended portions adjacent the sides of said core and tanks and forming with said back plate a shroud for said core; a pair of deflectors having their outer side edges disposed adjacent the side edges of said shell, means for swingably connecting said deflectors to said shell, and the bodies of said deflectors being shiftable to extend parallel to the plane of the core with their inner edges disposed adjacent each other and substantially centrally of the core.

11. An air temperature modifying unit including a core adapted to contain a fluid; inlet and outlet connections to said core; a front shell embracing a portion of said core and having an opening therein to admit the passage of air therethrough; means for circulating air through said core; a movable air deflector plate; means for pivotally supporting said deflector plate including an arm pivoted to said shell adjacent a lateral edge of the shell opening, said arm at its outer end being pivotally connected to said deflector plate whereby the latter may be adjusted to several positions.

12. An air temperature modifying unit including a core; a front shell therefor; inlet and outlet connections for said core; means for circulating air through the core, said shell having an opening to admit the passage of air therethrough; a pair of movable air deflector plates for the opening in said shell; a plurality of arms pivoted to said shell adjacent the lateral edges of said shell opening, said deflector plates being pivoted to the outer ends of said arms whereby said plates may be adjusted laterally with respect to said shell opening.

13. A heater including a core comprising upper and lower tanks, liquid conducting elements extending between and in communication with said tanks, a front shell element defining the margins of said core and extending beyond the same, a shroud element extending adjacent the rear of said core, cushioning means interposed between one of said elements and said core, said shroud element being formed with an opening for the passage of air, and a fan connected to said shroud element and in line with the opening thereof to force air through said core.

ROGER W. ANGSTMAN.